(12) United States Patent
Le Quesne et al.

(10) Patent No.: US 9,725,334 B2
(45) Date of Patent: Aug. 8, 2017

(54) RAPID FLOTATION DEVICE FOR WATER LADEN WITH SUSPENDED MATTER, AND METHOD FOR IMPLEMENTING SAME

(75) Inventors: Francois Le Quesne, Issy les Moulineaux (FR); Patrick Vion, Houilles (FR)

(73) Assignee: DEGREMONT (FR)

( * ) Notice: Subject to any disclaimer, the term of this patent is extended or adjusted under 35 U.S.C. 154(b) by 836 days.

(21) Appl. No.: 14/116,986

(22) PCT Filed: May 3, 2012

(86) PCT No.: PCT/IB2012/052225
§ 371 (c)(1),
(2), (4) Date: Feb. 27, 2014

(87) PCT Pub. No.: WO2012/153245
PCT Pub. Date: Nov. 15, 2012

(65) Prior Publication Data
US 2015/0291444 A1    Oct. 15, 2015

(30) Foreign Application Priority Data
May 12, 2011 (FR) .................................... 11 54109

(51) Int. Cl.
*C02F 1/24* (2006.01)
*C02F 9/02* (2006.01)
(Continued)

(52) U.S. Cl.
CPC .............. *C02F 1/24* (2013.01); *B03D 1/1412* (2013.01); *B03D 1/1431* (2013.01);
(Continued)

(58) Field of Classification Search
None
See application file for complete search history.

(56) References Cited

U.S. PATENT DOCUMENTS 2,759,607 A * 8/1956 Boyd ..................... B03D 1/008
                                                209/170
3,015,396 A * 1/1962 Quast ................... B03D 1/1431
                                                210/221.2
(Continued)

FOREIGN PATENT DOCUMENTS

CN     101362032    2/2009
CN     101668709    3/2010
(Continued)

OTHER PUBLICATIONS

Corresponding Chinese Search Report for Application No. 201280031091.4.
(Continued)

*Primary Examiner* — Thomas M Lithgow
(74) *Attorney, Agent, or Firm* — The Belles Group, P.C.

(57) ABSTRACT

The invention relates to a rapid flotation device, in particular using dissolved air, for treating water laden with suspended matter (MES). The device comprises a mixing area (B) separated from a flotation area (C) by a wall (n) above which the liquid to be treated passes from the mixing area. The bottom portion of the flotation area comprises: a perforated floor (1) located above an apron (R), a floated-water discharge being provided under the floor and leading to an outlet system (3); and at least two separate channels (2) which are oriented in the direction of flow of the water and are provided under the floor (1), and under optional structures (w) extending from the floor, to a point upstream of the outlet system (3). The downstream end (2.1) of the channels is open and located above the floor level, and a discharge means (V) is provided, for each channel, at the end of the downstream bottom portion of said channel.

19 Claims, 2 Drawing Sheets

(51) Int. Cl.
  *C02F 9/00* (2006.01)
  *B03D 1/14* (2006.01)
(52) U.S. Cl.
  CPC .............. *B03D 1/1475* (2013.01); *C02F 9/00* (2013.01); *C02F 2201/002* (2013.01)

(56) References Cited

U.S. PATENT DOCUMENTS

| | | | | |
|---|---|---|---|---|
| 4,681,682 | A * | 7/1987 | White | C02F 1/24 209/170 |
| 5,681,458 | A * | 10/1997 | Favret | B01D 17/0202 210/221.2 |
| 7,169,301 | B2 * | 1/2007 | Vion | C02F 1/24 210/205 |
| 8,480,907 | B2 | 7/2013 | Vion et al. | |
| 2009/0211974 | A1 * | 8/2009 | Bonnelye | B01D 21/0012 210/636 |

FOREIGN PATENT DOCUMENTS

| | | |
|---|---|---|
| EP | 0631800 | 4/1997 |
| WO | 00/43320 | 7/2000 |
| WO | 03/064326 | 8/2003 |
| WO | 2007/028894 | 3/2007 |

OTHER PUBLICATIONS

Guangcai, Geo, "A Novel Equipment for Treating Water Containing Greasy Dirt—Jet Floatation Device," China Offshore Oil and Gas (Engineering), vol. 12, No. 3, pp. 57-59, Jun. 30, 2000.

* cited by examiner

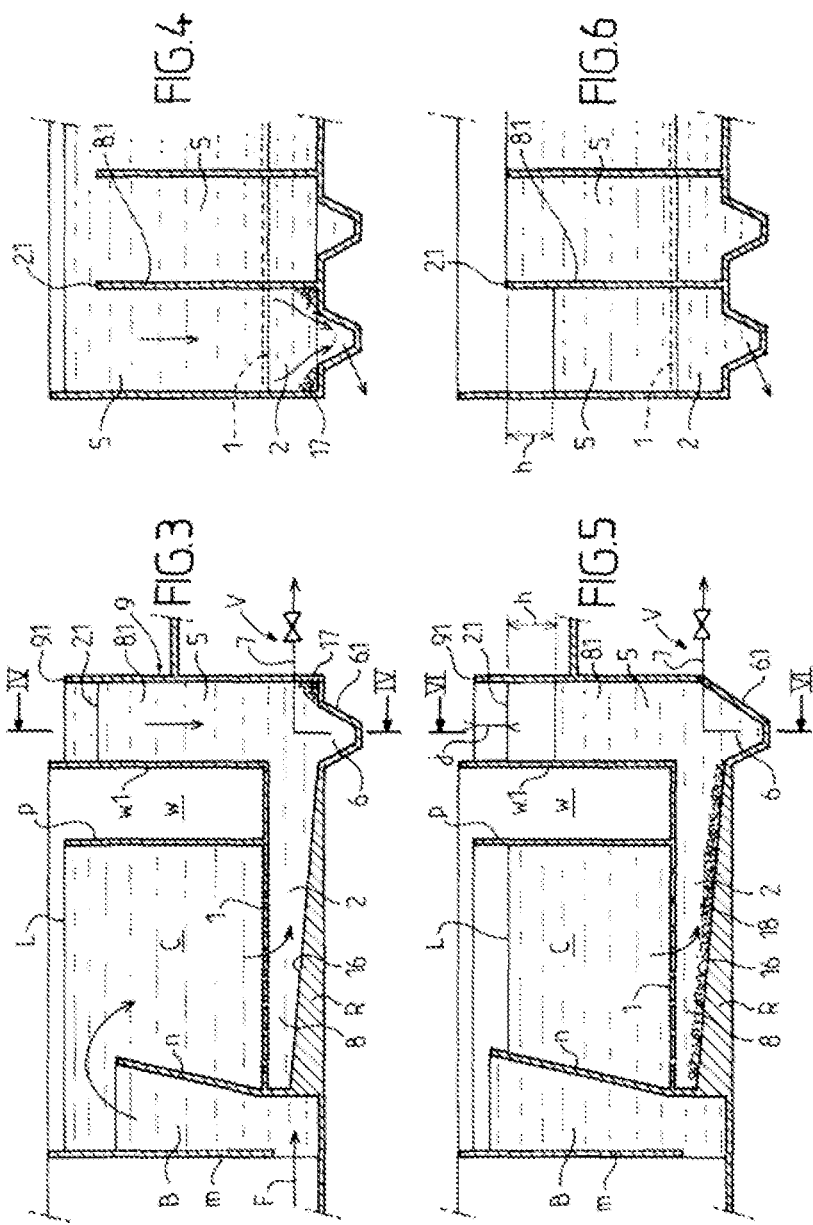

RAPID FLOTATION DEVICE FOR WATER LADEN WITH SUSPENDED MATTER, AND METHOD FOR IMPLEMENTING SAME

PRIORITY

Priority is claimed as a national stage application, under 35 U.S.C. §371, to international application No. PCT/IB2012/052225, filed May 3, 2012, which claims priority to French application 1154109, filed May 12, 2011. The disclosures of the aforementioned priority applications are incorporated herein by reference in their entirety.

The invention relates to a rapid flotation device, notably a dissolved air flotation device, for treating water laden with suspended matter (MES), which device is of the kind comprising a mixing zone, notably having means of injecting a pressurized liquid containing dissolved air, separated from a flotation zone by a wall above which the liquid for treatment, coming from the mixing zone, passes, the flotation zone comprising toward the bottom a perforated floor situated above a sole, a float water discharge being provided under the floor leading to an outlet system.

Flotation devices of this kind are known, notably from Mémento technique de l'eau, tenth edition, Degrémont, volume 2, pages 875-879 relating to dissolved gas flotation separators in which the attachment between the air bubbles and a flocculent is improved and allows high speeds of upward travel of up to 30-40 m/h of the bubble-flocculent aggregate.

EP 1 937 600 also relates to a flotation device of this kind, incorporated into a clarification device comprising a membrane-type filtration zone downstream of the flotation zone.

Thanks to the emergence, over the last few years, of these rapid dissolved air flotation separators, the field in which they are used has expanded widely, and they are used in numerous applications such as, amongst others, drinking water, sea water, waste water, industrial water and filter backwash water.

Some of these types of water are fairly laden with suspended matter, which means that there is an increased risk of deposits forming on the soles of the flotation devices. The main disadvantage with such deposits is that they detract from the hydraulic balance of the apparatus, particularly in the case of the flow of water over the floor and the uniform nature of this flow. When the apparatus has a high flotation speed, notably of 20 to 40 m/h on the flotation surface, the hydraulic balance becomes all the more critical.

Control over these deposits onto the sole is a key consideration in ensuring that the flow is distributed over the width of the flotation separator and in ensuring that it operates correctly over an extended period of time.

Floor sludge can be discharged, like float sludge, by use of a mechanical skimmer, or of a mobile vacuum cleaner for the bottom, which has to be introduced into the confined space between the perforated floor and the sole. Such an operation is relatively complicated.

In order to keep the use of flotation separation simple, economical and ecological, there is a desire to minimize all the mechanical equipment, which means that such discharge using a skimmer is not satisfactory.

In order to keep control over deposits onto the bottom, with discharge that does not call upon a mechanical means and without skimming, it has been proposed that use be made of multiple troughs under the entire flotation surface, or of bottom networks, which may be made up of perforated tubes.

This solution is not entirely satisfactory because the troughs involve significant construction costs and/or investment in equipment, whereas the networks are prone to plugging.

It is an object of the invention, above all, to provide a rapid flotation device of the kind defined hereinabove, which does not exhibit the disadvantages mentioned hereinabove or which exhibits them to a lesser extent and which, in particular, allows control over the deposits of sludge in the space situated under the floor by limiting the formation of such sludge and allowing it to be cleaned oat easily if need be. In particular, the water that the invention aims to treat may have a suspended matter (MES) concentration of between 20 and 1000 mg/l.

According to the invention, the rapid flotation device of the kind in question is characterized in that:

at least two separate canals, oriented in the direction in which the water flows, are provided under the floor and under any works that may extend the floor, leading to upstream of the outlet system, the downstream end of the canals is open and situated above floor level, and a discharge means is provided, for each canal, at the end of the downstream bottom part of this canal.

For preference, the open downstream end of the canals is situated at least 1 m (1 meter) above the level of the floor. Advantageously, this open downstream end of the canals is situated at the level of the float water overflow, or preferably below, at approximately 40 cm below the upper edge of the float water weir.

The canals situated under the floor may be separated by low walls that support the floor. Advantageously, the canals have a rising part just upstream of the outlet system, said rising parts being separated by the low walls which rise up beyond the floor.

The canals may comprise, at the foot of their rising part, a sludge takeoff and extraction piping. This takeoff may consist of a cavity into which the end of the extraction piping is clipped.

The canals are advantageously profiled to ensure that the flow of liquid flows at a high enough, substantially constant speed that is higher than the sludge surface-wash speed. The sludge surface-wash speed is the horizontal speed over a bed of sludge that is needed to allow the sludge on the surface of this bed to be washed off into suspension. The profile of the canals is advantageously provided by a bottom that is inclined, from upstream to downstream causing an increase in the depth and cross section from upstream to downstream.

The cross section of the rising part of the canal may be determined so that the upward speed of the liquid is higher than the speed at which the largest particles that may have escaped flotation sediment.

A float water withdrawal means may be provided in one of the rising parts of the canals, notably when a commonized part is situated above the top ends of the canals and communicates with all the canals, for pressurizing and injecting water into the mixing zone.

The invention also relates to a method for implementing a rapid flotation device as defined hereinabove, characterized in that, when operating in production, without shutting down the inlet of effluent that is to be treated, extraction with a high momentary flow rate is performed, for a short length of time generally lasting less than 2 min., on each canal by opening the discharge means in order to clear out the sludge deposited at the foot of the rising part of the canal.

In order to clean that part of a canal that is situated under the floor, production and the inlet of effluent that is to be treated are shut down, and the affected canal is swept by prolonged opening, lasting longer than 1 min., of the discharge means of that canal in order to cause the liquid level to drop below the upper edge of the rising part of the canal and sweep the canal essentially using water which passes through the floor, and to wash off and discharge any sludge that may have been deposited in the canal.

Advantageously, the speed of the flow in the canals during cleaning is between 200 and 1000 m/h, depending on the nature of the sludge.

In addition to the provisions set out hereinabove, the invention consists of a certain number of other provisions that will be covered more fully hereinbelow with reference to an exemplary but entirely nonlimiting embodiment which is described with reference to the attached drawings. In these drawings:

FIG. 3 is a simplified vertical section similar to FIG. 1 illustrating the extraction of sludge from the foot of the rising part of a canal during production.

FIG. 4 is a schematic section on IV-IV of FIG. 3.

FIG. 5 is a simplified vertical section, similar to FIG. 1, illustrating periodic hydraulic cleaning, with a production shutdown, and FIG. 6 is a schematic section on VI-VI of FIG. 5.

Figure 1:
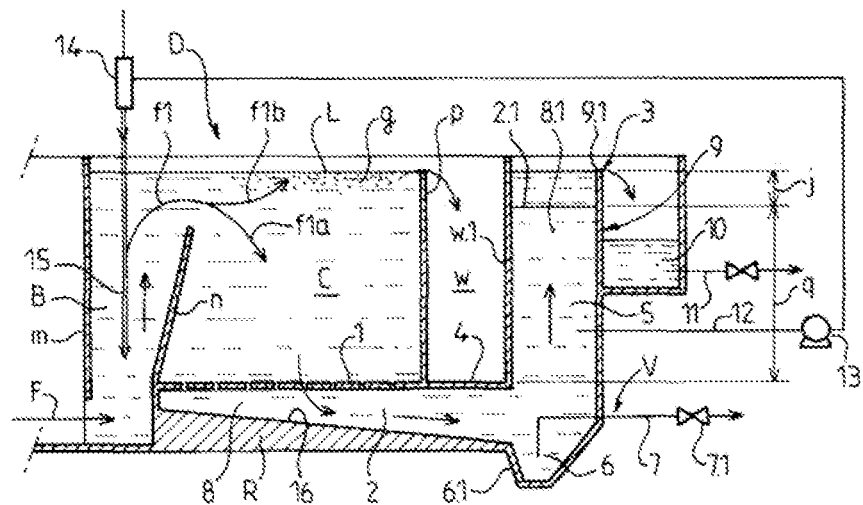
FIG. 1 is a schematic vertical section through a rapid flotation device according to the invention.
Figure 2:
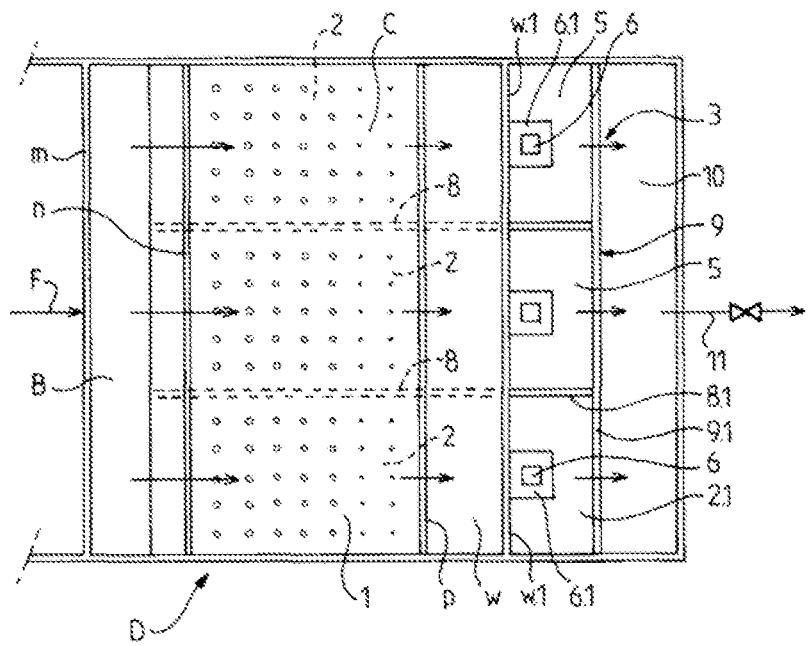
FIG. 2 is a view of the device of FIG. 1, from above.

With reference to the drawings, notably to FIGS. 1 and 2, it may be seen that the flotation device D according to the invention comprises, in a tank, a mixing and expansion zone B into which the water that is to undergo flotation arrives in the direction of the arrow F at the bottom, underneath a wall m, coming from a flocculation zone, not depicted, situated to the left of the wall m according to FIG. 1.

The mixing zone B is separated from a flotation zone C by a wall n which, for preference, diverges from the wall m from the bottom upward. The upper edge of the wall n is situated some distance, notably a few tens of centimeters, away from the upper level L of the liquid in the flotation zone C. The wall n extends as far as the sole R that constitutes the bottom of the tank.

The water passes over the top of the top edge of the wall n to arrive in the flotation zone as illustrated by an arrow f1 which splits into two branches of which one, f1$a$, directed downward, represents the path of the water that has been rid of the suspended matter, whereas the arrow f1$b$, directed upward, illustrates the path of the microbubbles laden with flocculant which head toward a bed of bubbles at the surface of the flotation zone C. The float sludge g recovered at the surface of the zone C is discharged into a sludge takeoff/degassing/storage pit w by passing over a wall p the upper edge of which forms a weir. The height of the wall p is generally between 2 m and 5 m.

In the lower part the flotation zone C comprises a perforated floor 1 situated above the sole R by a relatively short distance, of the order of several tens of centimeters. The perforations in the floor 1 are designed to ensure uniform flow in the flotation zone; in particular, the diameter of the perforations is greater upstream, near the wall n, and reduces progressively in the downstream direction toward the wall p. As an alternative, the perforations may all have the same diameter but there may be more of them per unit area near the wall n, this number per unit area decreasing in the downstream direction.

According to the invention, at least two separate independent canals 2, oriented in the direction in which the water flows, are provided under the horizontal floor 1 and extend as far as upstream of a float water outlet system 3, The canals 2 continue, beyond the floor 1, and pass under the bottom 4 of the pit w which constitutes a construction that extends the floor.

The open downstream end 2.1 of the canals is situated at a distance q (FIG. 1) above the level of the floor 1, so that each of the canals 2 has a rising part 5, beyond the pit w. The distance q is preferably at least 1 meter.

At the foot of the rising part, each canal has a sludge takeoff 6, at the bottom of a cavity 6.1 shaped like an inverted pyramid frustum, with extraction piping 7, fitted with a valve 7.1, constituting a discharge means V at the end of each canal downstream bottom part.

The canals 2 are separated by parallel vertical low walls 8, which constitute the side walls of these canals. The low walls 8, in their portion situated under the floor 1, act as supports for this floor and for the constructions that extend this floor, notably for the bottom 4 of the pit w. The use of these low walls to support the floor eliminates the need for other types of support, such as studs which create zones in which sludge can be deposited.

The pit w is delimited by a vertical downstream wall w.1. The rising part 5 of the canals is comprised between this wall w.1 and a downstream vertical wall 9 of the installation, of which the upper edge 9.1 is slightly below the level of the wall p.

The low walls 8 extend under the bottom 4 as far as the wall 9 and have a vertical part 8.1, orthogonal to the wall 9, delimiting the rising part 5 of the canals 2, The open upper end 2.1 of the canals corresponds to the top edge of the vertical part 8.1 of the low walls.

The open downstream end 2.1 of the canals is situated a distance q above the level of the floor 1, this distance g advantageously being equal to at least 1 m. The open end 2.1 is situated at the level 9.1 of the float water overflow, or preferably at a distance j (FIG. 1) of around 40 cm, below that.

The discharge means V or extraction system, of each canal, is designed to allow the tapping-off, both during production with effluents to be treated arriving continuously, or during shutdown when the inlet of effluent for treatment has been halted, of a flow rate Qs, which leaves via the pipe 7, that is higher than the nominal flow rate Qa with which each canal is supplied. This flow rate Qa corresponds to the flow rate of float water that passes through the floor 1 and arrives in each canal.

The installation according to the invention is designed in such a way that the speed Ua at which the water flows along each canal 2 under the floor 1, corresponding to the feed flow rate Qa in the horizontal part of the canals, is higher than the sludge surface-wash speed in order to limit deposits when the installation is operating at the nominal flow rate.

The sludge surface-wash speed is the horizontal speed over a bed of sludge that allows the sludge on the surface of this bed to be washed off into suspension.

The speed of upward travel of the water, in the rising part 5, is denoted Ud and corresponds to the flow rate Qa. The bore sections are determined such that this speed Ud is higher than the speed at which the largest particles that may have escaped flotation sediment.

The upper edge 9.1 of the downstream end wall 9 constitutes the weir of the outlet system 3 over which the float water passes to drop into a trough 10 from where it is removed, at the bottom, by a pipe 11. The trough 10 collects the float water from the various canals 2 and the pipe 11 collects all of the overflows from each canal.

The rising part 5 of each canal may extend up as far as the water level on the outlet weir, i.e. up to the level of the edge 9.1. Advantageously, the height of the weir specific to each rising part 5 may be adjustable.

If the rising part 5 extends up as far as the overflow wafer level 9.1, the upper edge 2.1 is level with the weir 9.1. The distribution of the float water flow rate across the entire width of the structure is ensured by having the weirs 9.1 associated with each rising part 5 at the same level, particularly if the floor 1 is not effective at ensuring the lateral distribution of the flow of float water further upstream.

If the floor 1 does provide good lateral distribution of float water flow, the rising part 5 of the canals 2 may stop at a level 2.1 situated below the water surface corresponding to the level 9.1 of the weir, making it possible to maintain just one, fixed or mobile, weir for all of the outlets from the canals 2. For preference, the upper edge of the vertical part 8.1 of the low wall, corresponding to the level 2.1, stops a distance j of around 40 cm below the water surface defined by the weir 9.1. The outlets of the canals are then commonized and in communication via the zone situated above the upper edges of the rising parts 8.1 of the low walls. This allows the water flow (for pressurizing and injecting into the mixing zone B) to be tapped off from the rising part of any canal 2, at a relatively low level in order to avoid the creation of a vortex. The water tapped off from a canal comes from the general flow because of the communication there is between the various canals in the commonized zone situated above the upper edges 2.1.

The water withdrawn through a pipe 12 for pressurizing using a pump 13 is sent into a device 14 for injecting and dissolving air into the pressurized water. The pressurized water containing dissolved air is injected via a tube 15 into the bottom part of the mixing zone B.

The bore section of the profiled canals 2 increases from upstream to downstream. This increase is advantageously achieved by a bottom wall 16 that is inclined from upstream to downstream as illustrated in FIG. 1.

In the example depicted in FIG. 2, three parallel canals 2 are provided in the bottom of the installation. The number of canals may be higher and is set according to the operating conditions.

The method for implementing the device according to the invention is as follows, notably with reference to FIGS. 3 to 6. In FIGS. 4 and 6 just two rising parts 5 of adjacent canals have been depicted for the sake of simplicity, but there are generally more than two canals.

Production

In production, i.e. when water for treatment is being inlet upstream, flocculated water arrives in the bottom part of the mixing chamber B and mixes with the pressurized water injected by the tube 15. The microbubbles formed, to which flocculants become attached, rise as the water flows to form a bed of bubbles in the upper part of the flotation zone C. The float sludge is recovered at the surface then discharged into the sludge takeoff/degassing/storage pit w.

The float water flows from the top downward in the flotation zone C and passes through the floor 1 to flow into the canals 2, rise in the rising part 5 and overflow, via the upper edge 9.1, into the float water recovery trough 10.

The extraction system formed by the discharge means V provided at the foot of the rising part of each canal allows deposited sludge 17 (FIGS. 3 and 4) which has been deposited around the sludge takeoff 6 at the foot of the rising part 5 of a canal to be extracted. To do that, the discharge means V associated with a canal is opened, this creating a high flow rate Qs, mainly from the top downward in the rising part 5, creating a high entrainment speed, notably twice the nominal flow rate of the canal if Qs=2 Qa. It will be recalled that Qa corresponds to the nominal flow rate of the canal.

This high entrainment speed places the deposits 17 around the sludge takeoff back in suspension and allows them to be discharged. The removal of the deposits from the foot of the rising part 5 of the canal also removes the starts of any deposits in the horizontal part of the canal 2, particularly under the floor 1. This extraction, the duration of which is limited to a few minutes, or even to less than 1 minute, corresponds to a preventive action which can be performed periodically on each canal separately without interrupting production.

Hydraulic Cleaning

It is also possible to perform periodic hydraulic cleaning (FIGS. 5 and 6) of the canals 2 in their parts situated under the floor 1. To do that, the flotation device is shut down, with the arrival of water for treatment stopped. Extractions are performed canal by canal.

When this operation is performed on a canal 2, by opening the emptying means V, as soon as the water level in the rising part 5 of the canal drops below the upper level of the low wall 8.1, i.e. drops below the edge 2.1 (see FIGS. 5 and 6), the extraction water flow rate is made up of water that has passed through the floor 1 and flows horizontally in the canal 2. This flow rate then reaches the horizontal part of the canal at speeds that are almost twice the sludge surface-wash speeds, still in the case where Qs=2 Qa, assuming a canal 2 that is relatively clean and the cross section of which has not been reduced by the presence of sludge. The speed of flow is higher than this value when there are substantial sludge deposits 18 in the canal reducing its bore section. These higher speeds entrain deposited sludge 18 as illustrated in FIGS. 5 and 6.

EXAMPLE

Use of the method is detailed with reference to an example regarding biological filter backwash water containing matter in suspension at a concentration of between 200 and 1000 mg/l.

The flotation device is capable of processing a flow rate of 360 $m^3$/h.

The surface area of the perforated floor 1 that ensures that the flow is evenly distributed measures 18 $m^2$. This floor opens onto four canals 2 each approximately 1 m wide. The height and profile of each canal are calculated so that at any point on the canal, at the nominal flow rate, the speeds of flow are higher than the sludge surface-wash speeds. The speeds of flow are between 200 and 1000 m/h depending on the nature of the sludge.

The apparatus is fitted with a mobile weir 9.1 and the option of positioning the upper edge 2.1 of the rising part 8.1 of the low wall of the canal 250 mm below the weir 9.1 (j=250 mm) has been taken up.

The outlet of float water, which passes over the weir 9.1, is therefore commonized, because it is distributed over all the canals, and the pressurizing water can be tapped off from any one of the cells formed by the rising parts of the canals. The outlet flow rate Qs may be equal to 180 $m^3$/h whereas the nominal flow rate of a canal and of a cell is 90 $m^3$/h.

The extraction system, which is a gravity or pumped extraction system, is designed to offer a flow rate of 180 $m^3$/h.

Extractions are performed cyclically, using automatic valves provided within the discharge means V.

In production, to prevent any deposit beginning to take hold on the outlet of the horizontal part of the canal at the foot of the rising part, periodic extractions are performed at least once a day. The momentary higher flow rate allows any sludge in and around the extraction zone 6 to be put back into suspension then entrained, as explained hereinabove.

However, following numerous shutdowns/startups and operations at flow rates below the nominal flow rate, sludge may build up under the floor 1, as depicted at 18 in FIGS. 5 and 6. Preventive hydraulic cleaning operations are performed periodically, particularly between once a week and once every three months depending on the type of sludge to be treated. As explained previously, this operation involves stopping the arrival of water for treatment in the flotation device and beginning cyclic extractions for each canal. The water level in the construction drops.

When this level drops below the upper edge 2.1 of the vertical part 8.1 of the low wall that ends each canal 2, the canals behave like isolated zones that communicate only upstream of the floor 1. The extraction flow rate Qs, which in the example being considered is 180 m$^3$/h, will come chiefly from water passing through the floor 1. This extraction flow rate is then twice the nominal flow rate and creates high surface-wash speeds under the floor.

If the canal 2 in question has very little in the way of deposits, the extraction speed is equal to twice the surface-wash speed. However, if as a result of more infrequent maintenance, or as a result of a malfunction, there is a great deal of deposit 18, then the extraction speed may reach ten times the surface-wash speed, thus guaranteeing that all the sludge will be out back into suspension.

Tapping-off from just one cell formed by the rising part 5 of a canal results in a drop in level h (FIG. 6) in this rising part 5 of the canal 2 concerned. This drop h in level is of the order of four times the pressure head created by the floor 1 and the upstream part of the canal 2 at the nominal flow rate, because the speed of flow is equal to twice the nominal speed (pressure head is proportional to the square of the speed). Thereafter, all the levels in the rising parts of the canals will drop in parallel, the difference between the downstream part of the canal from which fluid is being tapped off and the downstream part of the other canals then remaining constant and always of the order of four times the initial pressure head of the floor 1 and of the upstream part of the canal. This difference in level h preferably remains less than 1 m (one meter).

A flotation device according to the invention can be used for treating water laden with suspended matter leading to a denser froth of sludge at the surface of the flotation zone and to an accumulation of dense elements under the floor 1.

The invention claimed is:

1. A rapid flotation device for treating water laden with suspended matter (MES), comprising: structure defining a mixing zone and a flotation zone, the mixing zone and flotation zone separated by a wall above which the liquid for treatment, coming from the mixing zone, passes, the flotation zone comprising a bottom and a perforated floor located toward the bottom of the flotation zone, the perforated floor situated above a sole, a float water discharge being provided under the perforated floor leading to an outlet system, float water flowing from the flotation zone toward the outlet system, wherein:
    structure defining at least two separate canals, oriented in a direction of flow of the float water, are provided under the perforated floor and under any works that may extend the perforated floor, leading to upstream of the outlet system,
    a downstream end of the canals is open and situated above a level of the perforated floor,
    and a distinct discharge means for removing accumulated sludge is provided for each canal, at a downstream bottom part of each canal.

2. The device as claimed in claim 1, wherein the open downstream end of the canals is situated at least 1 m (1 meter) above the level of the floor.

3. The device as claimed in claim 1 wherein the open downstream end of the canals is situated close below a level of the float water overflow.

4. The device as claimed in claim 1, wherein the canals situated under the floor are separated by low walls that support the floor.

5. The device as claimed in claim 4, wherein the canals have a rising part just upstream of the outlet system, said rising parts being separated by the low walls which rise up beyond the floor.

6. The device as claimed in claim 5, wherein the canals comprise, at a foot of their rising part, a sludge takeoff and extraction piping.

7. The device as claimed in claim 6, wherein the takeoff consists of a cavity into which the end of the extraction piping extends.

8. The device as claimed in claim 1, wherein the canals are profiled to ensure that the flow of liquid flows at a high enough, substantially constant speed that is higher than the sludge surface-wash speed.

9. The device as claimed in claim 8, wherein the profile of the canals is provided by a bottom that is inclined from upstream to downstream causing an increase in the depth and cross section from upstream to downstream.

10. The device as claimed in claim 5, wherein the cross section of the rising part of the canals is determined so that the upward speed of the liquid is higher than the speed at which the largest particles that may have escaped flotation sediment.

11. The device as claimed in claim 5, wherein a float water withdrawal means is provided in one of the rising parts of the canals for pressurizing and injecting water into the mixing zone.

12. A method for implementing a rapid flotation device according to claim 1, wherein, when operating in production, without shutting down an inlet of effluent that is to be treated, extraction with a high momentary flow rate is performed on each canal by opening the distinct discharge means in order to clear out the accumulated sludge deposited at a foot of a rising part of each canal.

13. The method as claimed in claim 12, wherein in order to clean that part of a canal that is situated under the floor, production and the inlet of effluent that is to be treated are shut down, and the affected canal is swept by prolonged opening of the distinct discharge means of that canal in order to cause the liquid level to drop below the upper edge of the rising part of the canal and sweep the canal essentially using water which passes through the floor, and discharge any sludge that may have been deposited in the canal.

14. The method as claimed in claim 13, wherein the speed of the flow in the canals during cleaning is between 200 m/h and 1000 m/h, depending on the nature of the sludge.

15. The device as claimed in claim 1, wherein the rapid flotation device is a dissolved air flotation device.

16. The device as claimed in claim 1, wherein each distinct discharge means is located below a level of the perforated floor.

17. The device as claimed in claim 1, wherein each distinct discharge means is located at an end of the downstream bottom part of each respective canal.

18. The device as claimed in claim 1, wherein each distinct discharge means is located below a level of the perforated floor at an end of the downstream bottom part of each respective canal.

19. The device as claimed in claim 11, wherein a commonized part is situated above the downstream ends of the canals and communicates with all the canals.

* * * * *